Patented Aug. 3, 1948

2,446,251

UNITED STATES PATENT OFFICE 2,446,251

JOINT FILLERS

Travie W. Stricklin, Gordon Heights, Del., assignor to the United States of America, as represented by the United States Atomic Energy Commission No Drawing. Application July 13, 1945,
Serial No. 604,968

1 Claim. (Cl. 106—287)

This invention relates to crack and joint fillers, pipe dopes and the like. It is particularly concerned with compositions of the permanently plastic type as distinguished from cements which harden after application.

In the handling of elemental fluorine and highly reactive fluorides one of the main problems has been to secure materials sufficiently resistant to attack by the fluorine or fluorides so that the material may be confined within the system and leaks may be avoided.

An object of the invention is the provision of a crack and joint filler which is highly resistant to attack by elemental fluorine and metal fluorides in vapor phase. A further object of the invention is the provision of a permanently plastic composition which does not interfere with disassembly of apparatus in the assembly of which it has been employed. A still further object of the invention is the provision of such a composition which has sufficient lubricating properties to permit its application to threaded unions to serve as a lubricant and to permit application of high pressures with minimum torque in joining threaded unions.

The compositions of the present invention are intimate mechanical mixtures of stable inorganic fluorides and normally liquid highly fluorinated organic compounds containing 16 or more carbon atoms in the molecule.

The preferred compositions are mixtures having the consistency of a soft grease or paste comprising finely divided calcium or magnesium fluoride homogeneously mixed with a liquid mixture of fluorocarbons with from about 12 to 24 carbon atoms per molecule and having an average carbon content of about 20 carbon atoms per molecule, the proportions of fluoride and fluorocarbon being such as to provide the specified consistency. The proportions will vary depending upon the viscosity of the particular fluorocarbon or fluorocarbon mixture employed and the state of subdivision of the metal fluoride.

The compositions of the invention are suitable for use as pipe dopes for treatment of threads in the construction of pipelines used for conveying elemental fluorine or metal fluorides in vapor phase. They are also suitable for filling cracks or other types of joints exposed to such reactive materials. They may be used to lubricate and assist in the packing of friction or compression unions. They may be used in conjunction with other packing materials, for example with semi-inert materials, such as graphite, and with various types of gaskets, pump packing, and the like to improve their sealing properties.

The compositions of the invention may be prepared merely by thoroughly mixing the components or by simultaneously mixing and grinding them until the desired fineness is obtained. For threaded unions the solid fluoride is advantageously used as an impalpable powder. For other uses such as crack filling, substantially coarser material or blends of coarse and fine materials may be employed equally satisfactorily.

There are a number of metal fluorides having the inertness properties necessary for use in accordance with the invention. Any of these fluorides may be employed where elemental fluorine alone is the material to be handled. When the fluorine contains impurities the nature of these impurities should be considered in selecting the most suitable metal fluoride. Calcium, magnesium, strontium, and aluminum fluorides are suitable under most widely varying conditions. These fluorides are inert to hydrogen fluoride as well as elemental fluorine and consequently may be used to advantage in systems for conveying gases comprising both elemental fluorine and hydrogen fluoride. The preferred fluorides have the further property of substantial insolubility in water.

Fluorocarbons suitable for use in the compositions of the invention may be prepared by the fluorination of high-boiling hydrocarbon oils by silver difluoride, cobalt trifluoride, or manganese trifluoride. The most satisfactory fluorocarbons are free from other elements besides carbon and fluorine. However, small proportions of chlorine and even very small proportions of hydrogen do not seriously interfere with the stability of the product.

Fluorocarbon mixtures which have been found to be highly satisfactory have been prepared by the fluorination of lubricating oil fractions boiling above 300° C. at normal atmospheric pressure, and particularly petroleum lubricating oil fractions distilling at temperatures between 200° C. and 300° C. at 10 millimeters of mercury absolute pressure. These oils may be fluorinated in liquid or vapor phase at temperatures between 200° and 400° C. to provide fluorocarbon oils which distill from about 140° C. at 10 millimeters of mercury absolute pressure to about 200° C. at 0.4 millimeters of mercury absolute pressure and contain less than 0.1% of residual hydrogen.

Another suitable type of fluorocarbon mixture may be prepared by the liquid phase fluorination of highly chlorinated terphenyls, for instance, a chlorinated 50-50 mixture of ortho and meta terphenyls, containing about 68% chlorine, in a fluorocarbon solvent to provide fluorocarbon liquids containing from 4% to 30% of residual chlorine, distilling above about 140° C. at 10 mm. absolute pressure, and having average molecular formulæ from about $C_{18}ClF_{31}$ to $C_{18}Cl_8F_{24}$.

The following example further illustrates the invention.

Example

Three parts by weight of finely powdered anhydrous calcium fluoride and one part by weight of perfluorinated lubricant having a distillation range from 208° C. at 10 millimeters of mercury absolute pressure to 218° C. at 10 millimeters and containing less than 0.07% of residual hydrogen are thoroughly mixed to form a smooth paste. This paste may be stored for use at any future time. It is particularly useful for application to threaded unions, to serve, first, as a lubricant to permit drawing up the union tightly, second, as a sealant to prevent passage of elemental fluorine gas through the union.

I claim:

A permanently plastic pipe joint compound having lubricating properties which is highly resistant to attack by elemental fluorine and which is useful for application to threaded unions of pipes used for conveying gaseous fluorine which consists of a mixture of 3 parts by weight of finely powdered anhydrous calcium fluoride and 1 part by weight of a perfluorinated lubricant containing less than 0.07% of residual hydrogen and having an average carbon content of about 20 carbon atoms per molecule and a distillation range of 208° to 218° C. at 10 mm. Hg, said perfluorinated lubricant having been obtained by fluorinating a petroleum lubricating oil fraction which distills at temperatures between 200° C. and 300° C. at 10 mm. Hg.

TRAVIE W. STRICKLIN.

REFERENCES CITED

The following references are of record in the file of this patent:

UNITED STATES PATENTS

| Number | Name | Date |
| --- | --- | --- |
| 2,186,916 | Wiezevich | Jan. 9, 1940 |
| 2,250,483 | Hopkinson | July 29, 1941 |

FOREIGN PATENTS

| Number | Country | Date |
| --- | --- | --- |
| 5,891 | Great Britain | 1907 |